Patented Oct. 9, 1945

2,386,544

UNITED STATES PATENT OFFICE 2,386,544

METHOD OF PRODUCING METALLIC BODIES

Henry L. Crowley, South Orange, N. J.

No Drawing. Application April 17, 1943,
Serial No. 483,482

12 Claims. (Cl. 75—22)

This invention relates to a novel method of producing metallic bodies from powdered metals having a specific gravity of from two-thirds to less than one-half of similar bodies made by prior methods.

The main object of this invention is to produce metallic bodies of reduced specific gravity from powdered metals or powdered metal alloys as, for example, from powdered iron, aluminum, magnesium, copper, tungsten and the like and from powdered alloys of these metals.

Other and more specific objects of the invention will be apparent from the following description.

For example, a mixture of powdered iron 10 pounds, a resin such as a phenol resin 2 pounds, and a plasticiser such as stearic acid in an amount representing 20% of the weight of the resin, in this case $\frac{2}{5}$ of a pound, are thoroughly mixed together and then molded in a press in accordance with usual practice in this art under a pressure not greater than 10 tons per square inch and preferably of the order of 1 or 2 tons per square inch, to form a body of the desired size and shape. This body is then heat treated and sintered in accordance with usual practice at the usual temperatures to volatilize and carbonize the resin, which acts as a binder, and the plasticiser, which has waxing characteristics and facilitates the molding of the mixture into the desired shape. The result is an iron body having a specific gravity less than two-thirds of the spacific gravity of iron bodies made from powdered iron in accordance with usual practice.

Another method of producing a body in accordance with this invention comprises preparing a combined plasticiser and binder composed of the following ingredients in the proportions by weight indicated: stearic acids 2 parts, triethanolamine 1 part. These ingredients are thoroughly mixed and heated to approximately 200° F. until the color of the mixture becomes dark straw. To the mixture is then added 1½ parts of tricresyl phosphate which is stirred thoroughly into the mixture after which ½ part of a suitable resin, such as a phenol resin, is added to the mixture. The resulting combined plasticiser and binder is then mixed in the proportion by weight of 1 to 2 parts to 10 parts of powdered iron. This mixture is then molded, heat treated and sintered as before to provide a body of greatly reduced specific gravity.

An important characteristic of bodies produced in this manner is that they are as strong or nearly as strong as calculations from regular bodies produced by prior methods would indicate, notwithstanding the fact that they are much lighter.

Substantially the same procedure may be followed in the production of bodies from other metals such as tungsten, aluminum, magnesium, copper and the like or various alloys thereof, and of iron, as, for example, high content chromium iron alloys, aluminum iron alloys, aluminum magnesium alloys, tungsten and iron alloys, and the like. Indeed the various commonly used metals and their alloys may be treated in accordance with the process herein disclosed to obtain the objects thereof as described above.

It is apparent, therefore, that the scope of this invention is not to be determined by the illustrative examples herein given but rather by the claims.

What is claimed is:

1. A method of producing light weight metallic bodies which comprises preparing a mixture of iron, a resin and stearic acid in the proportions by weight of 10, 2 and 0.4 respectively, molding the mixture into the desired shape and sintering the mass to volatilize and carbonize the resin and plasticiser.

2. A method of producing lightweight metallic bodies which comprises preparing a mixture of metal, a resin and stearic acid in the proportions by weight of 10, 2 and 0.4 respectively, molding the mixture into the desired shape and sintering the mass to volatilize and carbonize the resin and plasticiser.

3. A method of producing lightweight metallic bodies which comprises preparing a mixture of metal alloy, a resin and stearic acid in the proportions by weight of 10, 2 and 0.4 respectively, molding the mixture into the desired shape and sintering the mass to volatilize and carbonize the resin and plasticiser.

4. A method of producing lightweight metallic bodies which comprises preparing a mixture of iron alloy, a resin and stearic acid in the proportions by weight of 10, 2 and 0.4 respectively, molding the mixture into the desired shape and sintering the mass to volatilize and carbonize the resin and plasticiser.

5. A method of producing a lightweight metallic body which comprises preparing a mixture of a metal and a combined plasticiser and binder comprising stearic acid, triethanolamine, tricresyl phosphate and a phenol resin in the proportions of 10 to 1, molding the mixture to the desired shape and heat treating the molded body to volatilize and carbonize the combined plasticiser and binder.

6. A method of producing a lightweight metallic body which comprises preparing a mixture of a metal alloy and a combined plasticiser and binder comprising stearic acid, triethanolamine, tricresyl phosphate and a phenol resin in the proportions of 10 to 1, molding the mixture to the desired shape and heat treating the molded body to volatilize and carbonize the combined plasticiser and binder.

7. A method of producing a lightweight metallic body which comprises preparing a mixture of iron and a combined plasticiser and binder comprising stearic acid, triethanolamine, tricresyl phosphate and a phenol resin in the proportions of 10 to 1, molding the mixture to the desired shape and heat treating the molded body to volatilize and carbonize the combined plasticiser and binder.

8. A method of producing a lightweight metallic body which comprises preparing a mixture of an iron alloy and a combined plasticiser and binder comprising stearic acid, triethanolamine, tricresyl phosphate and a phenol resin in the proportions of 10 to 1, molding the mixture to the desired shape and heat treating the molded body to volatilize and carbonize the combined plasticiser and binder.

9. A method of producing a lightweight metallic body which comprises mixing by weight 2 parts of stearic acid and 1 part of triethanolamine, heating the mixture to 200° F., adding 1½ parts or tricresyl phosphate while stirring thoroughly, adding ½ part of a phenol resin to the mixture, mixing 1 to 2 parts of said mixture to a powdered metal, molding the mixture to the desired shape, and heat treating to volatilize and carbonize the added mixture.

10. A method of producing a lightweight metallic body which comprises mixing by weight 2 parts of stearic acid and 1 part of triethanolamine, heating the mixture to 200° F., adding 1½ parts of tricresyl phosphate while stirring thoroughly, adding ½ part of a phenol resin to the mixture, mixing 1 to 2 parts of said mixture to a powdered alloy, molding the mixture to the desired shape, and heat treating to volatilize and carbonize the added mixture.

11. A method of producing a lightweight metallic body which comprises mixing by weight 2 parts of stearic acid and 1 part of triethanolamine, heating the mixture to 200° F., adding 1½ parts of tricresyl phosphate while stirring thoroughly, adding ½ part of a phenol resin to the mixture, mixing 1 to 2 parts of said mixture to a powdered iron, molding the mixture to the desired shape, and heat treating to volatilize and carbonize the added mixture.

12. A method of producing a lightweight metallic body which comprises mixing by weight 2 parts of stearic acid and 1 part of triethanolamine, heating the mixture to 200° F., adding 1½ parts of tricresyl phosphate while stirring thoroughly, adding ½ part of a phenol resin to the mixture, mixing 1 to 2 parts of said mixture to a powdered iron alloy, molding the mixture to the desired shape, and heat treating to volatilize and carbonize the added mixture.

HENRY L. CROWLEY.